United States Patent
Monen et al.

(10) Patent No.: US 7,646,694 B2
(45) Date of Patent: Jan. 12, 2010

(54) METHODS AND SYSTEMS FOR PROVIDING DATA TRACK IDENTIFYING INFORMATION ON A RECORDING MEDIUM

(75) Inventors: Marinus J. Monen, Stow, MA (US); Maarten R. de Haan, Cambridge, MA (US)

(73) Assignee: Opternity Storage, Inc., Cambridge, MA (US)

( * ) Notice: Subject to any disclaimer, the term of this patent is extended or adjusted under 35 U.S.C. 154(b) by 509 days.

(21) Appl. No.: 11/551,396

(22) Filed: Oct. 20, 2006

(65) Prior Publication Data

US 2007/0104037 A1 May 10, 2007

Related U.S. Application Data

(60) Provisional application No. 60/728,485, filed on Oct. 20, 2005.

(51) Int. Cl.
*G11B 7/0012* (2006.01)

(52) U.S. Cl. .................... 369/97; 369/44.11

(58) Field of Classification Search ............ 369/97, 369/93, 275.3, 59.25, 44.11, 13.37; 360/72.1, 360/75
See application file for complete search history.

(56) References Cited

U.S. PATENT DOCUMENTS

| | | | |
|---|---|---|---|
| 4,583,208 A | 4/1986 | Verboom | 369/32 |
| 4,669,070 A | 5/1987 | Bell | 369/44 |
| 4,982,077 A | 1/1991 | Kawamura | 235/494 |
| 5,120,136 A * | 6/1992 | Oakley | 369/97 |
| 5,452,285 A | 9/1995 | Monen | 369/275.3 |
| 6,084,740 A * | 7/2000 | Leonhardt et al. | 360/78.02 |
| 6,442,296 B1 | 8/2002 | Smith et al. | 382/237 |
| 6,690,636 B1 * | 2/2004 | Marchant | 369/97 |
| 6,961,200 B2 * | 11/2005 | Lee et al. | 360/72.1 |
| 7,029,726 B1 * | 4/2006 | Chen et al. | 427/555 |
| 7,079,343 B2 | 7/2006 | Molstad et al. | 360/51 |
| 2002/0167751 A1 | 11/2002 | Lee et al. | 360/72.1 |
| 2005/0117493 A1* | 6/2005 | Sueki et al. | 369/96 |

FOREIGN PATENT DOCUMENTS

WO    WO 94/07330    3/1994

OTHER PUBLICATIONS

International Search Report dated Feb. 7, 2008 for PCT/US06/60116 filed Oct. 20, 2006. Applicant: Opternity Storage, Inc.

* cited by examiner

*Primary Examiner*—Thang V Tran
(74) *Attorney, Agent, or Firm*—Burns & Levinson LLP; Orlando Lopez

(57) ABSTRACT

A method and system for formatting of recording media.

12 Claims, 8 Drawing Sheets

| SF 0 | SF 1 | SF 2 | SF 3 | SF 4 | SF 5 | SF 6 | SF 7 | State |
|------|------|------|------|------|------|------|------|-------|
| X | X | X | X | X | X | X | X | 0 |
| X | O | X | X | X | X | X | X | 1 |
| X | X | O | X | X | X | X | X | 2 |
| X | X | X | O | X | X | X | X | 3 |
| X | X | X | X | O | X | X | X | 4 |
| X | X | X | X | X | O | X | X | 5 |
| X | X | X | X | X | X | O | X | 6 |
| X | X | X | X | X | X | X | O | 7 |

O = omitted servo mark    SF= Servo field    X= presence of servomark

| SF 0 | SF 1 | SF 2 | SF 3 | SF 4 | SF 5 | SF 6 | SF 7 | |
|------|------|------|------|------|------|------|------|---|
| X | X | X | O | X | X | X | O | Sync 1 |
| X | X | O | X | X | O | X | X | Sync 2 |

Multigroup patterns:
Sync 1: xxxoxxxoxxxoxxxoxxxo....
Sync 2: xxoxxoxxxxoxxoxxxxoxxoxx....

METHODS AND SYSTEMS FOR PROVIDING DATA TRACK IDENTIFYING INFORMATION ON A RECORDING MEDIUM

CROSS REFERENCE TO RELATED APPLICATIONS

This application claims priority of U.S. Provisional Application 60/728,485 entitled "COORDINATE SYSTEM FOR HIGH-DENSITY TAPE RECORDING USING ONE-PASS ACROSS-TRACK FORMATTING," filed on Oct. 20, 2005, which is incorporated by reference herein.

BACKGROUND OF THE INVENTION

This invention relates generally to recording media, and, more particularly, to the formatting of recording media.

In the case of optical tape, which is typically hundreds of meters long, it is a necessity that each track will have an identifiable track number and that each block of data along the track will have a block number, both of which are inscribed on the tape during the formatting process, so that this information can be retrieved reliably when the tape is used later for recording and/or reading of user data.

It is therefore a need to provide a method that adds both track number information and block number information to the formatted pattern in such a manner that its primary functionality, which is to provide reliable tracking position error information, is not disturbed. It is a further need to be able to add this information during the same formatting operation, so that a one-step process is maintained without requiring a separate formatting step.

In summary there is a need for a simple method to modulate track & block number information onto the servomark pattern that satisfies both the need for efficient formatting during tape manufacturing as well as the need for a reliable positioning grid, used during recording or reading of user data.

BRIEF SUMMARY

In one embodiment, these teachings describe the process of adding track and block number information to the servo marks on the recording medium (such as, but not limited to, optical tape) during the formatting process. This modulation is performed by omitting certain servomarks from the regular sequence of servomarks, as would be formatted in case no track and block number information would be required. The occurrence of these "omitted" marks is such that they will be infrequent enough to not disturb in any manner the derivation of a reliable tracking error signal. At the same time the occurrence of the omitted marks will be frequent enough to allow for the reliable derivation of track and block numbers during reading or writing of user data. In one embodiment, these teachings describe the specific manner of encoding track & block numbers while embedding them in the sequence of the servomarks being formatted.

In anther embodiment, the track & block numbers in adjacent tracks can be aligned in such a manner that synchronization between adjacent tracks is obtained. This will allow random-access track jumps without having to re-acquire synchronization of block numbers.

For a better understanding of these teachings, together with other and further objects thereof, reference is made to the accompanying drawings and detailed description and its scope will be pointed out in the appended claims.

DETAILED DESCRIPTION

These teachings relate generally to recording media, such as, but not limited to, optical media, and, more particularly, to the formatting of recording media such as, but not limited to, optical tape used for high-density data or information storage, by creating a distributed and dispersed pattern of marks in such a manner that the reading of this pattern allows for the precise identification of each data track.

Figure 1:
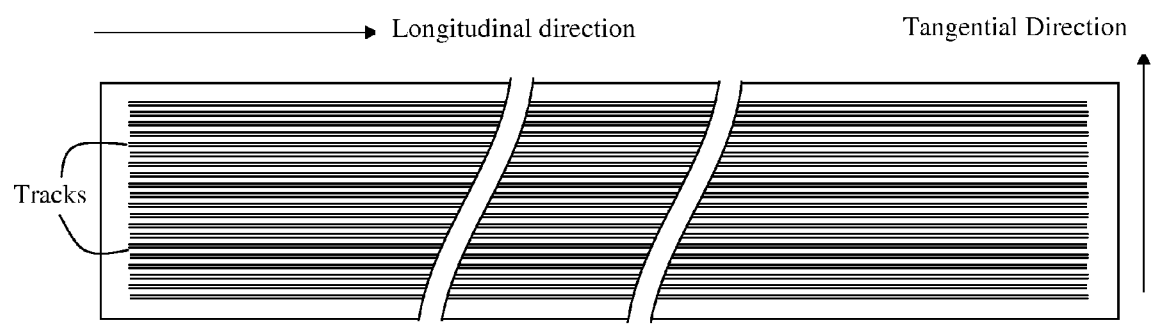
FIG. 1 is a schematic plan view of an optical tape segment showing the longitudinal and tangential direction of the tape.

In particular, one embodiment of these teachings relate to U.S. Patent Publication 2007/0036042 corresponding to U.S. patent application Ser. No. 11/504,754, "METHODS AND SYSTEMS FOR IN-TRACK OPTICAL POSITIONING ," both of which are incorporated by reference herein, that describes a formatting process and method by which "virtual tracks" are created on an optical tape as a result of recording a dispersed pit pattern of servomarks on regular intervals (see FIG. 1). While this regular pattern of servomarks allows for a tracking system to operate, the tracking system does not contain any coordinates that identifies the precise track that is being followed, nor does it contain any coordinates that identify the precise position along the track being followed.

In an embodiment of these teachings, the desired track and block number information is added by omission of certain servomarks without disturbing the regular repetition pattern of these servomarks, rather than resorting to any other modulation system that relies on variations of the nominal servomarks positions either in the tangential direction (positioning servomarks with their centers offset to the left or right of the track center) or in the longitudinal direction (positioning servomarks ahead or trailing the regular positions of the servomarks in the absence of modulation).

In the context of U.S. Patent Publication 2007/0036042 corresponding to U.S. patent application Ser. No. 11/504,754, "METHODS AND SYSTEMS FOR IN-TRACK OPTICAL POSITIONING," both of which are incorporated by reference herein, which forms the basis for one embodiment of the teachings described herein, it is undesirable to apply any type of modulation that changes either position or the shape of the servomarks. Modulation of the tangential position with respect to the center of the tracks would interfere with the correct derivation of the tracking error signal. Modulation of the position of the servomarks in the longitudinal direction would interfere with the system that derives precise clock synchronization from the servomarks.

Equally important are the barriers to creating tangential and or longitudinal pit position deviations of the servomarks, given the fact that the formatting of the servo marks occurs under high speed in the tangential direction and that such pit position deviations may have to occur in opposite directions between adjacent servomarks of two neighboring tracks, which would require a very high frequency spatial optical modulator with very high bandwidth. Similarly it is difficult to modulate the length of the servomarks in the longitudinal direction while writing those servomarks in the tangential direction.

Therefore, in an embodiment of these teachings, information is imparted to the servomarks during the formatting process by the omission of certain servomarks at certain locations. Also, in an embodiment of these teachings, one-pass formatting operation is maintained while embedding track and block number information within the stream of servomarks being recorded. The omission of certain servomarks is obtained by blocking certain write pulses electronically in the signal that drives the laser diode that generates the recording laser beam.

Figure 2:
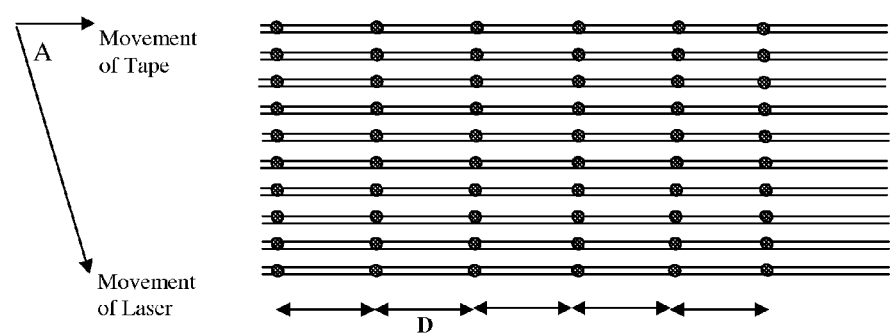
FIG. 2 represents the configuration of servomarks on the tape after formatting without the addition of track number and block number information.
Figure 3:
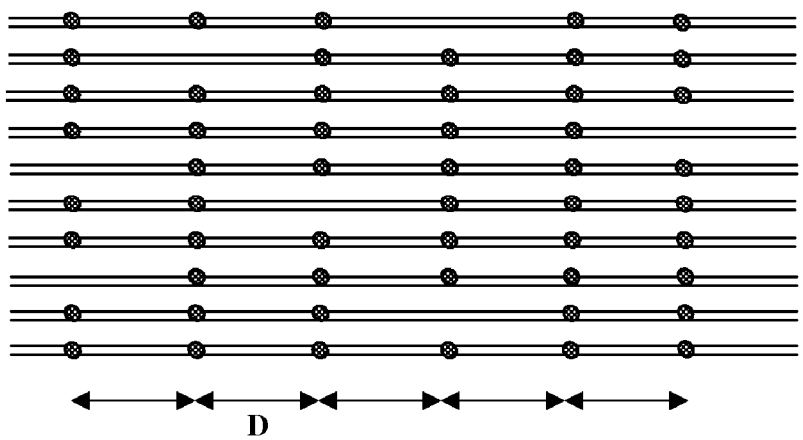
FIG. 3 represents an embodiment of the configuration of servomarks on the tape after formatting with the addition of track number and block number information.

In this manner the regularity of the distance D between servomarks (see FIGS. 2 and 3; FIG. 2 shows the in-track alignment and repetition distance of servomarks in each track) is always maintained, which is an important requirement for the derivation of an accurate timing signal. The selection of the size and position of the servomark in the servo field is done in such a manner that the servo fields will be significantly different from any patterns in other parts of the track, where data has been recorded. This unique pattern will make the servomarks easily distinguishable upon the initiation of a read or write sequence on the tape and allows for unambiguous detection of the servomarks, regardless whether data has been recorded or not.

If one embodiment, the servomark pulses so derived will be used as inputs to a PLL (Phase Locked Loop) that generates a clock frequency, which is used as the basis for controlling the timing of all read or write actions on the selected track. The generation of such clock signal with the help of a PLL can be implemented in many conventional ways. The omission of certain pulses from the regular sequence of servomarks will be infrequent enough so as to not impede or diminish the accuracy of the clock frequency generated by the PLL.

In order to better illustrate the systems and methods of the present teachings, results and details of an exemplary embodiments are presented hereinbelow. The numbers used in this specific example are for illustrative purposes. Many different specific selections for the recording and reading system parameters, such as the choice of the particular modulation code (also referred to in the literature as "channel code") for the actual representation of the bit stream to be recorded on the tape tracks, are within the scope of the present teachings.

Figure 4:
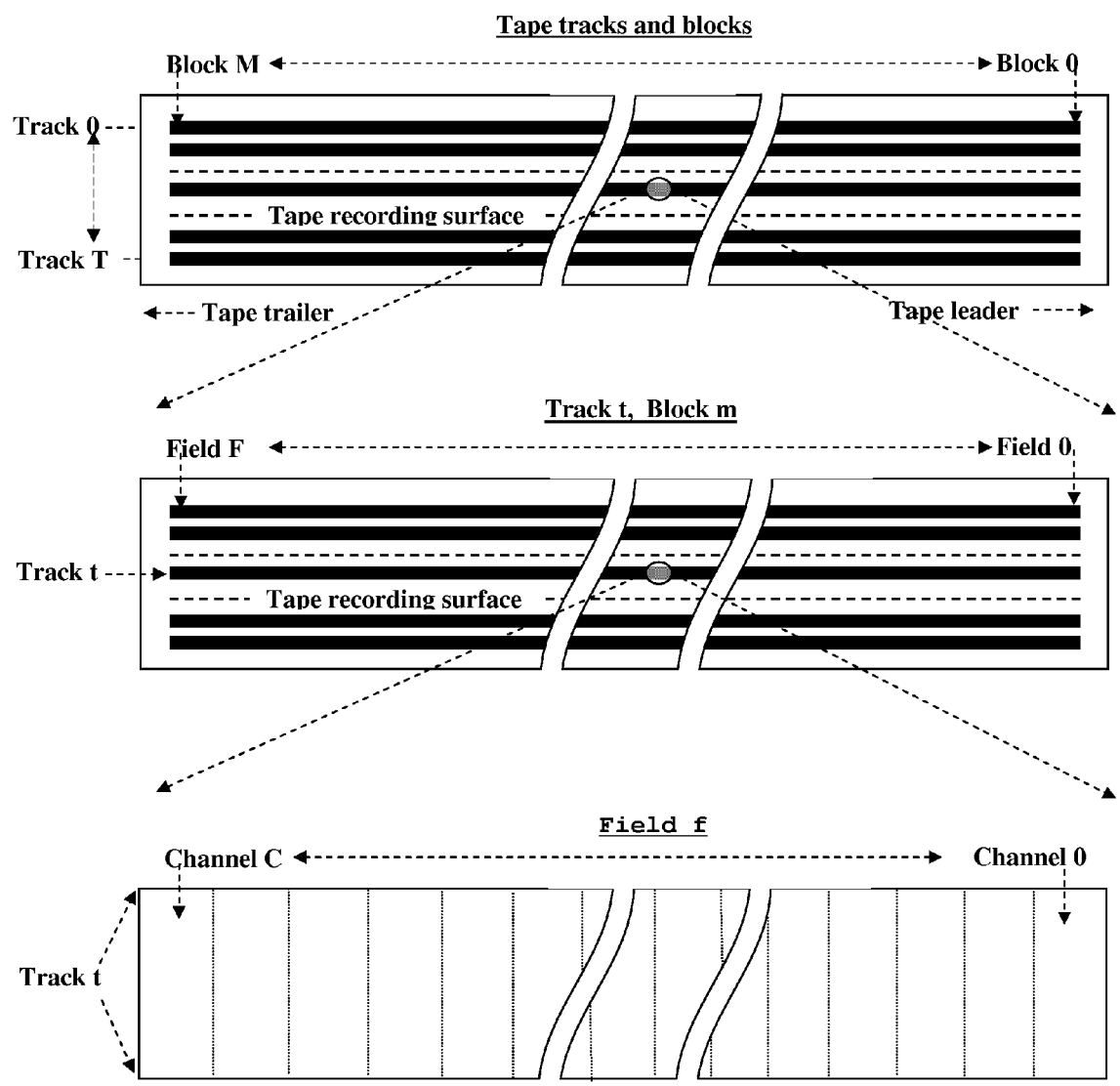
FIG. 4 shows an embodiment of the layout of tracks on the tape and the definition of data Blocks, byte Fields and Channels with 2 levels of detail.

For definition and further reference purposes tracks (0, . . . , T) and data blocks (0, . . . M) are defined as indicated in FIG. 4. A data block represents the minimum amount of data bytes that is to be recorded together under one block address. For example a data block may have a length F that corresponds to 16,384 ($2^{14}$) bytes. Each byte is recorded on the track in a space called a "Field". Each field (0, . . . , F) is divided in sub elements called "Channels". Depending on the characteristic of the modulation code chosen, each field has a maximum of C channels. A channel represents the minimum space required in which a transition from an unrecorded part of the track to a recorded part of the track (marking a pit of a certain length) may occur or vice versa a transition from a marked part to an unmarked part. For example, as in the case of the EFM modulation code used in the DVD system, a field may consist of 16 channels. Thus one byte of data is represented in one field having a granularity of 16 channels.

Figures 5, 6, 7:
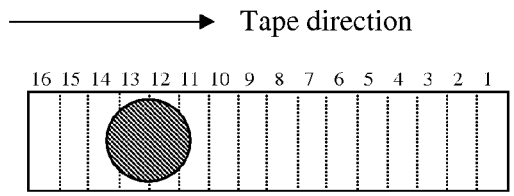
FIG. 5 shows an embodiment of a Servo Field, the embodiment containing a servomark centered on channel position 14 with a leading edge on position 13 and a trailing edge on position 15.
FIG. 6 shows an embodiment of the format of these teachings, the embodiment defining 8 states in a group of 8 Servo Fields, where only one servomark in each group is omitted. For State 0 no servomarks are omitted, wherein a Servo Group can carry 3 bits of information.
FIG. 7 shows an embodiment of the format of these teachings in which two unique patterns that can be created in a Servo Group by allowing 2 servomarks to be omitted.

There are two types of fields: Data Fields (DF) that are used to record user data and Servo Fields (SF) that contain the servomarks recorded in the formatting of the tape. The length and the number of channels per field are identical for data fields and servo fields. FIG. 5 depicts a servo field with a recorded servo mark. The position of the servomark in its field is chosen in the second half of the field. The primary purpose of this is to always have a blank (unrecorded) section during the first half of the servo field. There are two secondary reasons for the blank first half of the servo field. First it can be used as a reference area for the focus servo by taking a perfect sample of the focus distance at that point. Secondly some modulations systems, like EFM, require that the first channels of a field are kept free to accommodate an occasional extension of a data mark recorded in the previous field as a result of the modulation rule applied. The position of the servomark in this example is coincident with channel position 11 (leading edge) through 14 (trailing edge) with its center on the boundary of positions 12 and 13. The selection of the position of the servomark should be done such that the resultant blank number of channels in the servo field does not correspond to any allowed number of blank channels in the particular modulation code chose. This will then lead to a unique servo field pattern that can be distinguished easily from any recorded data. In case a servomark is omitted from the formatting sequence a servo field would result that is entirely blank, which should also not be a permissible pattern for recorded data under the modulation system chosen.

Servo Fields are occurring on regular intervals determined by the choices made in the formatting process. For example one servo field will occur after 64 data fields. The sequence of servo fields is grouped in sets of 8 consecutive servo fields denoted SF0 though SF7 and defined as a "Servo Group". If SF0 is always required to have a servomark and only one of the subsequent servo fields SF1 through SF7 is allowed to have an omitted servomark, then 8 different states can be defined, as shown in table 6. The first state, where no servomark is omitted in the group of 8, is defined as zero. The other states are representing the numbers 1 through 7 corresponding to omitted servomarks in servo fields SF1 through SF7. Eight states correspond to 3 binary bits: $2^3=8$. Thus no omitted mark or one omitted mark in a sequence of 8 servo fields represents 3 bits of data depending on the position of the omitted mark in the field of 8. The fact that SF0 will always have a servomark guarantees that there will never occur a situation that two servomarks are omitted in two subsequent servo fields on the boundary of two servo groups.

If a maximum of 2 servomarks are allowed to be omitted in a servogroup, while maintaining the requirement that no adjacent omission may occur it is possible to define two distinct repetitive patterns that can be identified and used for initial synchronization purposes. FIG. 7 shows two patterns: "Sync 1" where there will be always 3 servomarks between omitted marks and "Sync2" where there will be either 2 or 4 servomarks between omitted marks. These two patterns can be used for synchronization of the Servo Group sequence. In conjunction both can be used during a lead-in synchronization period to determine unambiguously the starts position of each servo group.

The omission of a single servomark in a string of 8, or even the omission of 2 servomarks in a string of 8, as is the case for the two synchronization patterns, will not disturb the proper functioning of the system that derives the tracking error signal from the string of servomarks because the sampling frequency of the servomarks is several times a multiple of the minimum sample frequency (the so-called Nyquist frequency) that would be required to maintain the desired bandwidth of the tracking loop system.

After initial synchronization each servo group will generate 3 bits of data upon read back. For example 32 servo groups combined will be able to generate 96 bits equal to 12 bytes of data. Only 2 bytes are necessary to encode the track number (up to a maximum of 65536 tracks). For encoding of the block numbers 2 bytes will also suffice. Two more bytes will be used to add error correction capability to the 4 bytes of block and track addresses. This would require a total of 6 bytes for secure track and block address detection. The remainder of 6 bytes (equal to 16 servo groups) can be used to encode additional information such as a repetition of the 3 least significant bits of the track addresses. This additional information will aid in the continuous verification of reading and or writing to the correct track and will enhance the reliability of the random access system that steers the read/write laser beam to the desired track.

Figure 8:
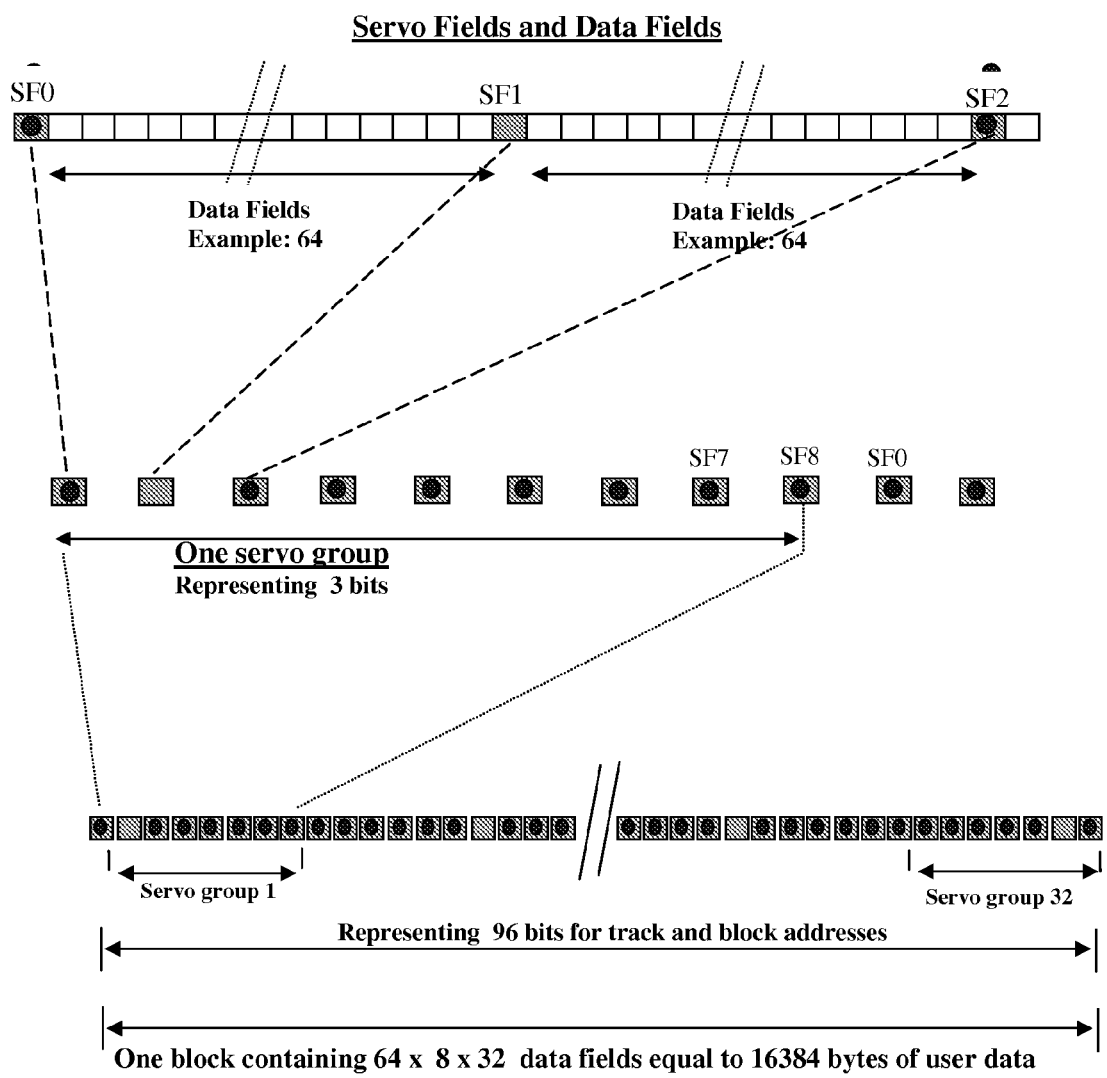
FIG. 8 shows an embodiment of the format of these teachings depicting the relationships between Servo Fields and Data Fields within a Block.

The relationship between servo fields and data fields, the combination of 8 consecutive servo fields into one servo group that can carry 3 bits of information, the formation of strings of 32 servo groups that can carry 96 bit of information (96 bits of track and block address data), and the length of the user data block are all shown together in FIG. 8 for this particular example. The track addresses for each block in the same track are identical. The block addresses increment with 1 for each block in the same track. The block addresses across tracks are identical for all tracks.

In case tracks are grouped in bands as described in the above reference application, the most significant bits of the track address can be used to identify the specific band and the least significant bits can be used to identify the track in each band.

Figure 9:
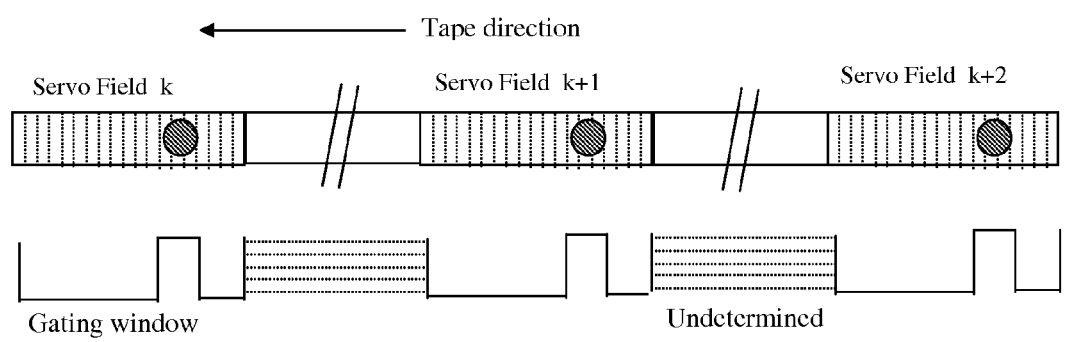
FIG. 9 shows an embodiment of the format and system of these teachings depicting how a gating window is provided for the detection of Servo Fields and its servomarks.
Figure 10:
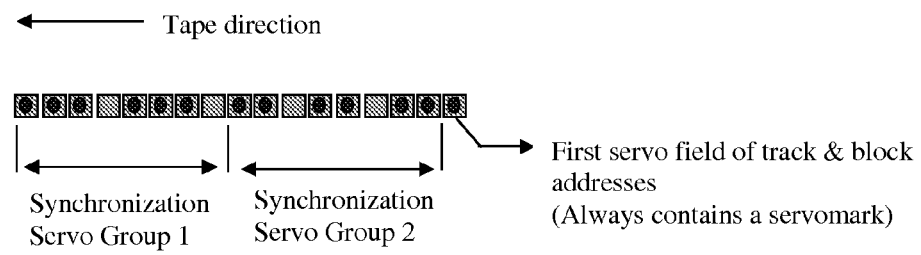
FIG. 10 shows an embodiment of the format and system of these teachings depicting the physical representation of the two unique synchronization patterns obtained by using the unique synchronization patterns in a sequence of two Servo Groups.

In one embodiment, the initial synchronization after startup of the tape or after returning to normal read/write speed after a fast forward or fast rewind operation will take place in 3 steps. First a clock synchronization will be obtained from the detection of the repetitious servo field pattern, regardless whether data fields are still empty or were previously filled with recorded user data. Secondly an exact gating window will be established that anticipates the position of the next servo field as well as the expected position of its servo mark. FIG. 9 shows the gating window for servo field detection. If no servo mark is detected the gating window will be setup for the next servomark. Once servomarks are detected information is derived from these marks to be able to close the tracking loop. This ensures that the read/write laser beam will remain on a track center. The third step in the synchronization is to identify the start of each block with the help of the two synchronization patterns of the servo fields as described in FIG. 7. In a particular configuration it is proposed to use just 2 synchronization groups: Sync servogroup 1 followed by Sync servogroup 2. The resulting pattern, shown in FIG. 10, is unique and can be matched with the predetermined sequence to obtain the exact position of the first servogroup. Thereafter track and block addresses will be decoded for each block. The error correction applied over these track and block numbers will assure perfect verification of these. After the initial synchronization lock is obtained, the system will benefit further from the additional information that results from the predictability of track and block numbers. This will allow maintaining a hard lock of the entire synchronization even in case of dropouts on the tape or other imperfections in the read/write process.

Figure 11:
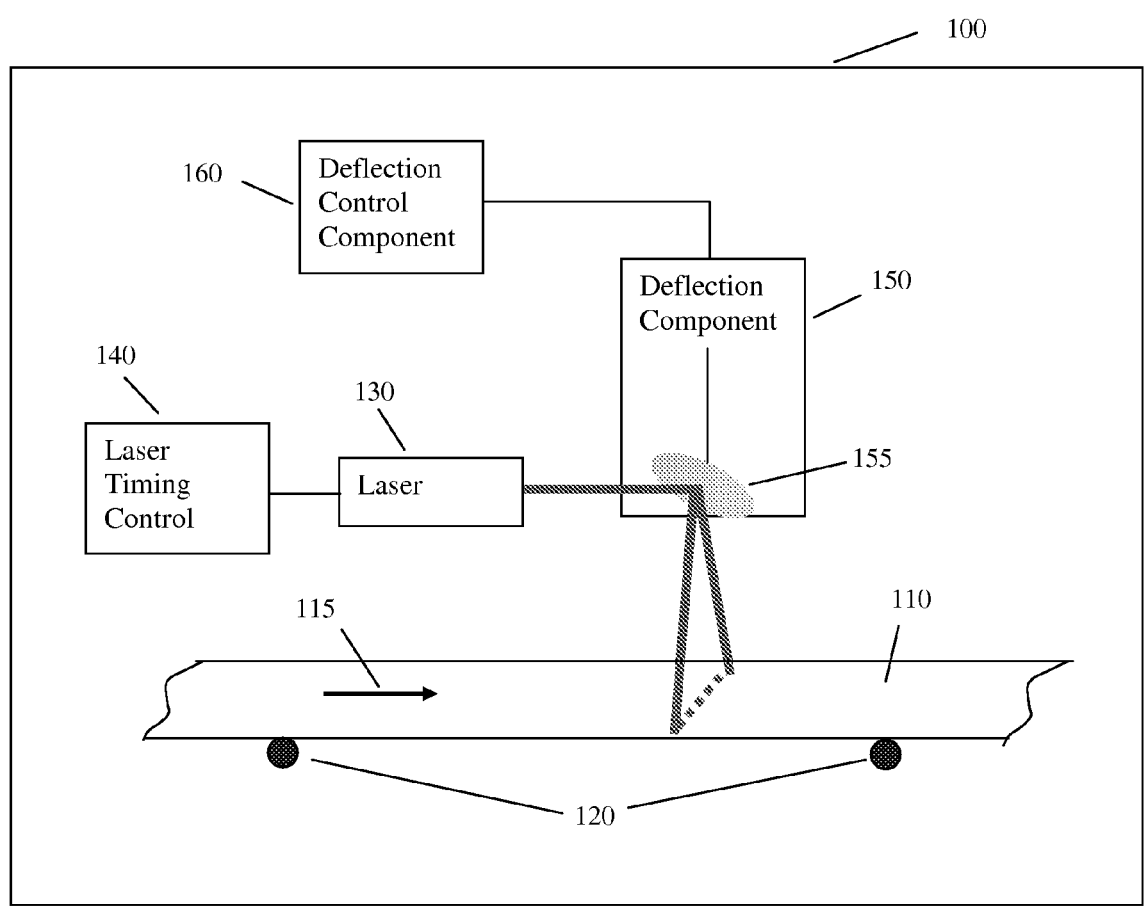
FIG. 11 is a schematic block diagram representation of an embodiment of the across-track formatting system of this invention.
Figure 12:
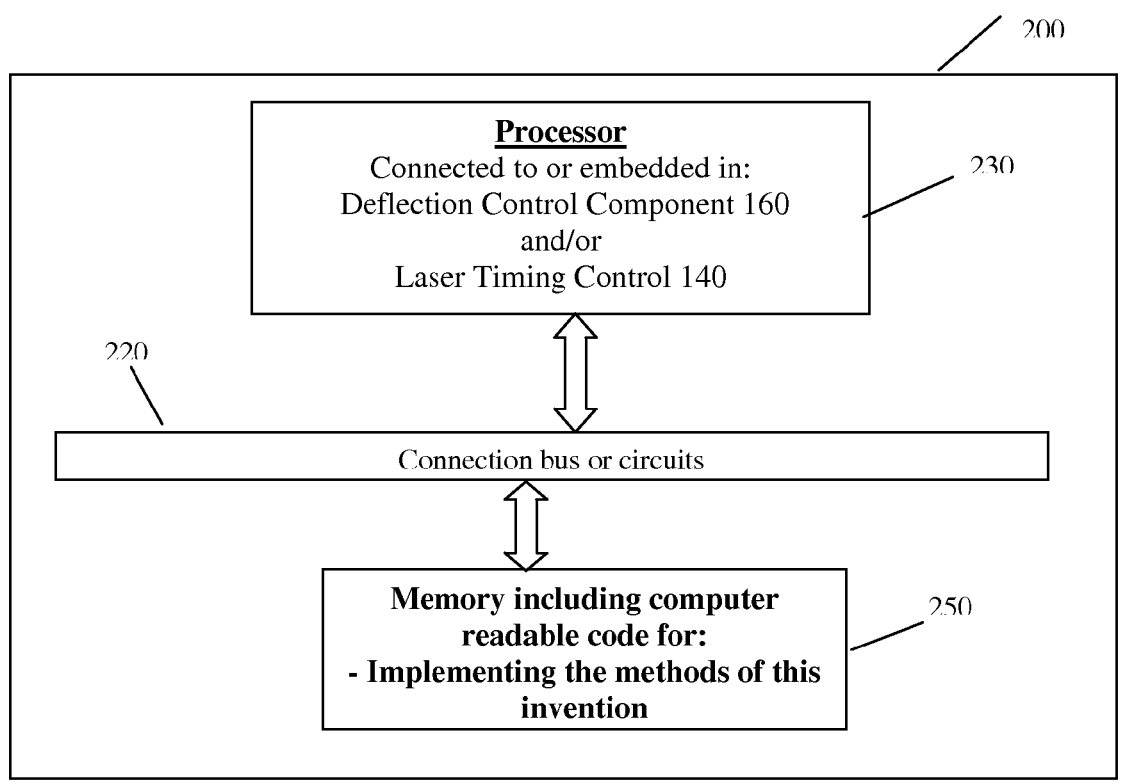
FIG. 12 is a schematic block diagram representation of an embodiment of a processor component of the across-track formatting system of this invention.

An embodiment of the system of this invention is shown in FIG. 11. Referring to FIG. 11, the embodiment 100 of the system of this invention creates servo marks on a tape 110 that is being transported by a transport system 120 in a longitudinal direction 115 (indicated by the arrow in FIG. 11). The embodiment 100 of the system of this invention includes one or more lasers 130, a deflection component 150, a deflection control component 160 and a laser timing control component 140. The deflection component 150 contains a deflection element 155 such as, but not limited to, a galvo mirror, a rotating polygon, an acousto-optical deflector or an electro-optical deflector. The deflection component 150 deflects the laser beam in a direction substantially transverse to the longitudinal direction 115 of tape motion. The deflection can occur at 90° to the longitudinal direction 115 or at a predetermined angle. The deflection control (in one embodiment, in conjunction with the design of the deflection component 150) determines the path of the laser beam. The laser timing control component determines the time and duration of the creation of servomarks (such as the configuration shown in FIG. 2 or FIG. 3). It should be noted that a processor component 200 as shown in FIG. 12 can be used in conjunction with the laser timing control component 140 and the deflection control component 160, shown in FIG. 11. The laser timing control component 140 and the deflection control component 160 can, in one embodiment, include one or more processors 230 (FIG. 12) and one or more computer usable media 250 (FIG. 12) having computer readable code embodied therein that causes the one or more processors to control the laser timing and/or the deflection component in order to obtain the desired servomark pattern, including the omitted locations of the servo marks that provide the identifying information for the track and block numbers. In embodiments in which the laser timing control component 140 and the deflection control component 160 include one or more processors 230 and one or more computer usable media 250, the one or more processors 230 are operatively connected to the one or more computer usable media 250 by interconnection means 220 (such as, but not limited to, a computer bus or a carrier wave). It should be noted that the laser timing control component 140 and the deflection control component 160 can utilize the same processor and the same computer readable media and that other combinations in which the laser timing control component 140 and the deflection control component 160 share one of the two above-mentioned components are also possible.

Although this invention has been described in the context of optical tape, the methods of this invention and format obtained from those methods are applicable to other embodiments of optical recording media.

Some advantages of the invention, although not all the advantages, lie in the fact that a reliable track and block address detection methodology is created as an embedded system of the distributed servo mark pattern that serves the derivation of a tracking error signal. A characteristic of the invention is that the track and block address information are recorded at the same time as the formatting of the tape with the distributed servomark pattern, thus maintaining a one-pass operation. Another characteristic of the invention is that the information containing the track and block addresses is added to the stream of servomarks by a selective and infrequent omitting of certain servomarks, that does not disturb the servomark frequency, nor impacts the generation of a reliable clock signal and a reliable tracking signal.

Elements and components described herein may be further divided into additional components or joined together to form fewer components for performing the same functions.

Each computer program (code) within the scope of the claims below may be implemented in any programming language, such as assembly language, machine language, a high-level procedural programming language, or an object-oriented programming language. The programming language may be a compiled or interpreted programming language.

Each computer program may be implemented in a computer program product tangibly embodied in a computer-readable storage device for execution by a computer processor. Method steps of the invention may be performed by a computer processor executing a program tangibly embodied on a computer-readable medium to perform functions of the invention by operating on input and generating output.

Common forms of computer-readable or usable media include, for example, a floppy disk, a flexible disk, hard disk, magnetic tape, or any other magnetic medium, a CDROM, any other optical medium, punched cards, paper tape, any other physical medium with patterns of holes, a RAM, a PROM, and EPROM, a FLASH-EPROM, any other memory chip or cartridge, a carrier wave, or any other medium from which a computer can read.

These teachings have been described with respect to various embodiments, it should be realized these teachings are also capable of a wide variety of further and other embodiments within the spirit and scope of the appended claims.

What is claimed is:

1. A method for providing identifying information for a data track in an optical tape, the method comprising the steps of:
    a) transporting the optical tape in a longitudinal direction;
    b) scanning at least one laser beam in another direction, the another direction being substantially transverse to the longitudinal direction;
    c) selecting size and position of a plurality of spaced recording locations in order to obtain a distinguishable pattern of said spaced recording locations;
    d) recording a plurality of servomarks at a majority of locations from said plurality of spaced recording locations; each servomark from said plurality of servomarks being substantially located on a data track;
    e) omitting recording at preselected locations from said plurality of spaced recording locations;
    f) returning said at least one laser beam back to a position substantially on the longitudinal direction; and
    g) repeating steps (b) through (f) in order to form all servomarks from said plurality of servomarks in one pass of the optical tape from substantially a beginning of the optical tape to substantially an end of the optical tape;
    wherein said preselected locations constitute a pattern providing the identifying information.

2. The method of claim 1 further comprising the steps of:
    selecting a spacing between subsequent ones of said plurality of spaced recording locations, said spacing corresponding to a sampling frequency substantially higher than a predetermined frequency.

3. The method of claim 1 wherein the step of omitting recording at preselected locations comprises the step of omitting recording at most a predetermined number of locations in each group from the plurality of groups of servomarks.

4. The method of claim 3 wherein the step of omitting recording at preselected locations comprises the step of recording at least one servomark after omitting recording at one of the preselected locations.

5. The method of claim 1 wherein, for a majority of said servomarks, one servomark from said plurality of servomarks located on the data track is substantially aligned with another servomark located on an adjacent data track.

6. A system for providing identifying information for data tracks in an optical tape, the system comprising:
    a transport system transporting the optical tape in a longitudinal direction;
    at least one laser;
    at least one deflection component deflecting at least one beam from said at least one laser;
    a deflection control component controlling said at least one deflection component so that said at least one beam scans the optical tape in a direction substantially transverse to the longitudinal direction;
    a laser timing control component controlling an intensity of said at least one beam in order to form servomarks on the optical tape at predetermined positions;
    at least one processor; and
    at least one computer usable medium having computer readable code embodied therein, said computer readable code causing said at least one processor to provide control signals to the laser timing component and the deflection control component in order to provide identifying information for a data track in the optical tape, the control signals causing the laser timing component and the deflection control component to:
    a) select size and position of a plurality of spaced recording locations in order to obtain a distinguishable pattern of said spaced recording locations;
    b) deflect and control said at least one laser in order to record a plurality of servomarks at a majority of locations from said plurality of spaced recording locations; each servomark from said plurality of servomarks being substantially located on a data track from a plurality of data tracks;
    c) omit recording at preselected locations from said spaced plurality of recording locations; and
    d repeat a) through c) in order to form all servomarks from said plurality of servomarks in one pass of the optical tape from substantially a beginning of the optical tape to substantially an end of the optical tape;
    wherein said preselected locations constitute a pattern providing the identifying information.

7. The system of claim 6 wherein the computer readable code further causes said at least one processor to provide control signals causing the laser timing component and the laser deflection component to:

select a spacing between subsequent ones of said plurality of spaced recording locations, said spacing corresponding to a sampling frequency substantially higher than a predetermined frequency.

8. The system of claim 6 wherein, in causing the laser timing component and the laser deflection component to deflect and control the laser in order to record marks at a majority of locations, the computer readable code also causes the laser timing component and the laser deflection component to deflect and control said at least one laser in order to record a plurality of groups of servomarks; and wherein, in causing the laser timing component and the laser deflection component to omit recording at the preselected locations, the computer readable code also causes the laser timing component and the laser deflection component to omit recording at most a predetermined number of locations in each group from the plurality of groups of servomarks.

9. The system of claim 8 wherein, in causing the laser timing component and the laser deflection component to omit recording at the preselected locations, the computer readable code also causes the laser timing component and the laser deflection component to deflect and control said at least one laser in order to record at least one servomark after omitting recording at one of the preselected locations.

10. The system of claim 8 wherein, in causing the laser timing component and the laser deflection component to deflect and control the laser in order to form said plurality of servo marks, the computer readable code causing the laser timing component and the laser deflection component to form servomarks wherein, for a majority of said servomarks, one servomark from said plurality of servomarks located on one data track is substantially aligned with another servomark located on an adjacent data track.

11. The system of claim 6 wherein said at least one deflection component comprises at least one galvo minor.

12. The system of claim 6 wherein said at least one deflection component comprises at least one deflection component selected from the group consisting of rotating polygons and acousto-optical deflectors.

* * * * *

UNITED STATES PATENT AND TRADEMARK OFFICE
CERTIFICATE OF CORRECTION

| | |
|---|---|
| PATENT NO. | : 7,646,694 B2 |
| APPLICATION NO. | : 11/551396 |
| DATED | : January 12, 2010 |
| INVENTOR(S) | : Marinus J. Monen et al. |

Page 1 of 1

It is certified that error appears in the above-identified patent and that said Letters Patent is hereby corrected as shown below:

In column 8, line 16 (claim 3) "recording at most" should read -- recording at at most --

In column 10, line 9 (claim 10) "servo marks" should read -- servomarks --

Signed and Sealed this

Second Day of March, 2010

David J. Kappos
*Director of the United States Patent and Trademark Office*